US010099844B2

(12) United States Patent
Rival et al.

(10) Patent No.: US 10,099,844 B2
(45) Date of Patent: Oct. 16, 2018

(54) DEVICE FOR DISPENSING A COSMETIC PRODUCT IN AEROSOL FORM, ASSOCIATED ASSEMBLY AND METHOD

(71) Applicant: L'OREAL, Paris (FR)

(72) Inventors: François Rival, Saint-Ouen (FR); Jeanne Gaudillot, Saint-Ouen (FR); Kerem Aubret, Saint-Ouen (FR); Clément Jaunet, Saint-Ouen (FR); Yann Gounon, Saint-Ouen (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 15/519,236

(22) PCT Filed: Oct. 16, 2015

(86) PCT No.: PCT/EP2015/074044
§ 371 (c)(1),
(2) Date: Apr. 14, 2017

(87) PCT Pub. No.: WO2016/059226
PCT Pub. Date: Apr. 21, 2016

(65) Prior Publication Data
US 2017/0233172 A1 Aug. 17, 2017

(30) Foreign Application Priority Data
Oct. 17, 2014 (FR) .................... 14 60034

(51) Int. Cl.
B65D 83/00 (2006.01)
B65D 83/48 (2006.01)
(Continued)

(52) U.S. Cl.
CPC ............. B65D 83/48 (2013.01); B65D 47/02 (2013.01); B65D 83/20 (2013.01); F16K 15/145 (2013.01)

(58) Field of Classification Search
CPC .... Y10T 137/87378; Y10T 137/87394; B65D 83/75; B65D 83/753; B65D 83/7535;
(Continued)

(56) References Cited

U.S. PATENT DOCUMENTS 3,081,919 A * 3/1963 Samuel .................. B65D 83/48
137/599.16
3,342,382 A * 9/1967 Huling .................. B05B 1/1645
222/402.17
2004/0144803 A1 7/2004 Baker

FOREIGN PATENT DOCUMENTS

FR 2 808 783 A1 11/2001

* cited by examiner

Primary Examiner — Paul R Durand
Assistant Examiner — Randall Gruby
(74) Attorney, Agent, or Firm — Polsinelli PC

(57) ABSTRACT

The dispensing device comprises a dispensing valve comprising: a valve body (40); an actuating rod (42), defining a dispensing duct for the product (62); a return element (44) of the actuating rod (42) to its blocking position. The dispensing device comprises a non-return valve (70) arranged inside the actuating rod (42). The non-return valve (70) comprises a deformable portion (74) between a closed position, applied against a lateral face (61) of the actuating rod (42), in which the circulation of fluid in the duct (62) through an inlet orifice (64) for product entry in the rod is made impossible, and an open position, separated from the lateral face (61) of the actuating rod (42), in which the circulation of fluid through the inlet orifice (64) is possible.

20 Claims, 2 Drawing Sheets

(51) Int. Cl.
*B65D 83/20* (2006.01)
*F16K 15/14* (2006.01)
*B65D 47/02* (2006.01)

(58) Field of Classification Search
CPC ........ B65D 83/20; B65D 83/48; B65D 47/02; F16K 15/145
See application file for complete search history.

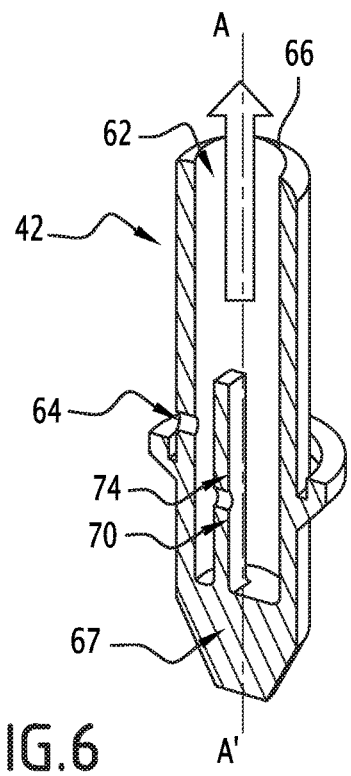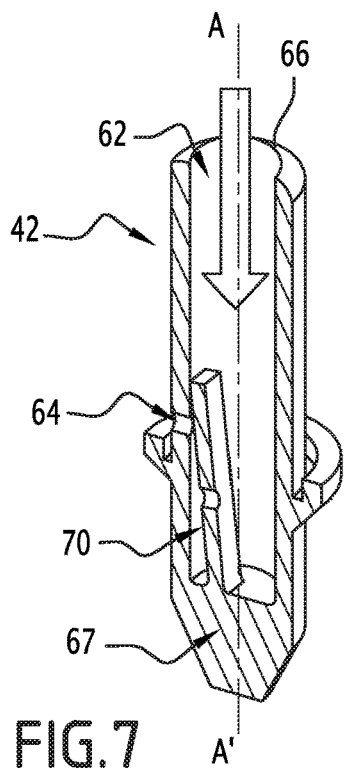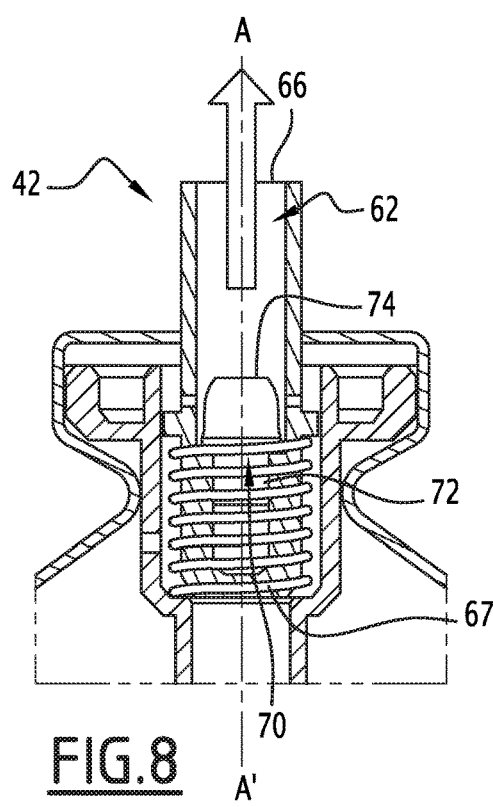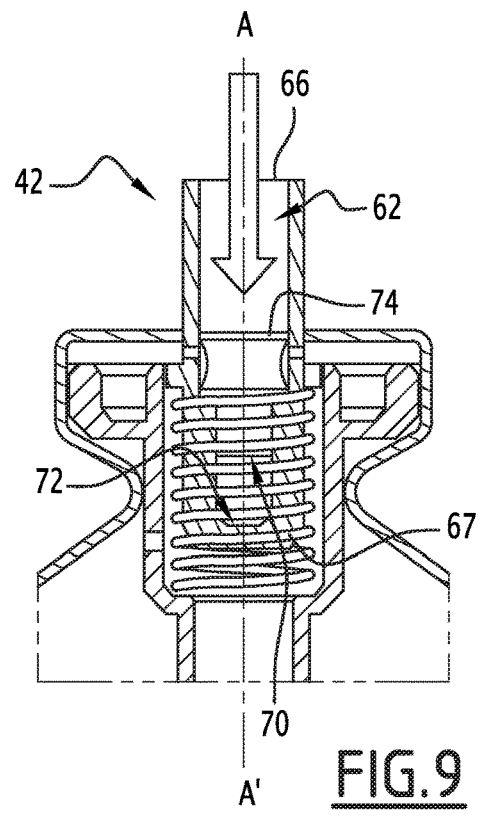

DEVICE FOR DISPENSING A COSMETIC PRODUCT IN AEROSOL FORM, ASSOCIATED ASSEMBLY AND METHOD

CROSS REFERENCE TO RELATED APPLICATIONS

This application is a National Phase filing under 35 U.S.C. § 371 of PCT/EP2015/074044filed on Oct. 16, 2015; and this application claims priority to Application No. 1460034 filed in France on Oct. 17, 2014 under 35 U.S.C. § 119. The entire contents of each application are hereby incorporated by reference.

This invention relates to a dispensing device for a cosmetic product in aerosol form, of the type comprising:
- a valve body, defining a chamber interior to the valve body opening onto the outside of the valve body by a product inlet opening and by a passage opening,
- an actuating rod, defining a product dispensing duct, inside the rod, the duct opening onto the outside of the rod via at least one product inlet orifice and via an product outlet orifice, the actuating rod being mounted mobile in the chamber of the valve body between a product releasing position, wherein the inlet orifice is in fluidic communication with the chamber and the outlet orifice is outside of the chamber, and a product blocking position, wherein the inlet orifice is not in fluidic communication with the chamber, and
- a return element of the actuating rod to its blocking position.

The invention also relates to an assembly for packaging the cosmetic product comprising such a dispensing device, and a method of manufacturing this assembly for packaging.

The cosmetic product is for example a perfume, a toilet water, a deodorant, or a hair styling product. More generally, the cosmetic product is a product as defined in EC Regulation N° 1223/2009 of the European Parliament and the Council of Nov. 30, 2009, relating to cosmetic products.

Assemblies for packaging comprising devices for dispensing of the aforementioned type are known, in particular in FR-A-2 925 032. These assemblies contain a cosmetic product under pressure, generally in liquid form, in a reservoir closed by the dispensing device. The cosmetic product is normally retained in the reservoir by the dispensing device. However, when the actuating rod is displaced to the releasing position, the cosmetic product exits spontaneously from the reservoir by the dispensing duct under the effect of the pressure present inside the reservoir. Most often, a diffuser coupled to the outlet orifice divides the cosmetic product exiting the reservoir into small droplets which, projected into the air, form a spray.

Once empty, these assemblies for packaging can again be filled by injecting a new product into the reservoir by the intermediary of the dispensing device. To this effect, it is sufficient to displace the actuating rod to the releasing position, then to inject the new product under pressure into the orifice for exiting.

Unscrupulous people take advantage of this possibility of reusing empty assemblies for packaging to fill the used prestigious brand assemblies for packaging with products of lesser quality, then to sell these articles by presenting them as originals. This fraud, other than the lack of revenue that it creates for the brands concerned, damages the image of these brands.

A purpose of the invention is to prevent this fraud by limiting the re-use of empty assemblies for packaging.

To this effect, the invention has for object a dispensing device of the aforementioned, comprising a non-return valve arranged inside the actuating rod, the non-return valve comprising a deformable portion between a closed position, applied against a lateral face of the actuating rod, in which the circulation of fluid in the duct from the outlet orifice through the inlet orifice is rendered impossible, and an open position, separated from the lateral face of the actuating rod, in which the circulation of fluid through the inlet orifice to the outlet orifice is possible.

According to particular embodiments of the invention, the dispensing device also has one or several of the following characteristics taken in isolation or in any technically possible combination:
- the movable portion of the non-return valve is deformable radially in relation to an axis of the rod, with at least one point of the non-return valve remaining fixed axially with respect to the rod;
- the closed position forms an idle position, the deformable portion in its open position being urged toward its closed position;
- the open position forms the idle position, the deformable portion in its closed position being urged toward its open position;
- the actuating rod comprises two diametrically opposite inlet orifice, the deformable portion covering the two inlet orifice in its closed position;
- the non-return valve comprises a base fixed on a bottom of the rod;
- the base is mounted by force into the bottom of the rod;
- the non-return valve is made in one piece with the rod;
- the deformable portion is a membrane advantageously made of elastomer.

The invention further has for object an assembly for packaging a cosmetic product comprising a reservoir containing a cosmetic product and a dispensing device closing said reservoir, wherein the dispensing device is a dispensing device such as defined hereinabove.

The invention also has for object a method for producing an assembly for packaging such as described hereinabove, comprising the following successive steps:
- supplying of the reservoir and of the dispensing device, filling of the reservoir;
- irreversible closing of the reservoir with the dispensing device with the non-return valve being arranged in the dispensing duct.

According to particular embodiments of the invention, the method also has one or several of the following characteristics taken in isolation or in any technically possible combination:
- the non-return valve is arranged in the dispensing duct before the filling of the reservoir, the filling of the reservoir being carried out around the dispensing device, without displacement of the actuating rod in releasing position.
- the non-return valve is arranged in the dispensing duct after the filling of the reservoir.

Further features and advantages of the invention will emerge after reading the following description given solely as an example with reference to the appended drawings in which:

FIG. 6 is a cross-section view of a second assembly for packaging according to the invention, when the non-return valve is in open position;

FIG. 7 is a cross-section view of the second assembly for packaging according to the invention, when the non-return valve is in closed position; and FIG. 8 is a cross-section view of a third assembly for packaging according to the invention, when the non-return valve is in open position;

FIG. 9 is a cross-section view of the third assembly for packaging according to the invention, when the non-return valve is in closed position.

Figure 1:
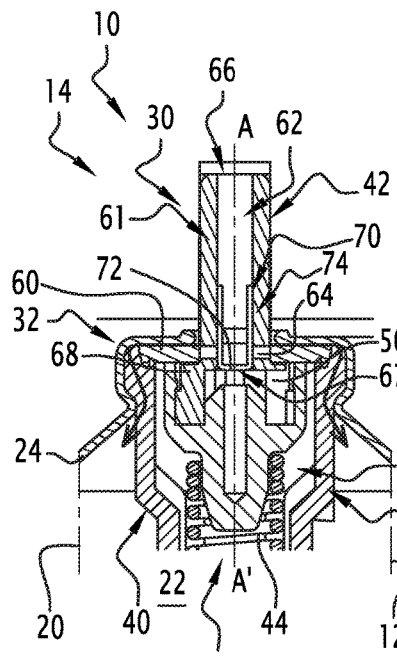
FIG. 1 is a cross-section view of a first assembly for packaging according to the invention during the filling phase of the assembly for packaging.

The assembly for packaging 10 of FIG. 1 comprises a reservoir 12 and a dispensing device 14 closing the reservoir 12.

The reservoir 12 comprises, in a known manner, a wall 20 defining an internal cavity 22 for receiving a cosmetic product. The internal cavity 22 opens outside of the reservoir 12 by a neck 24 arranged at the end of the wall 20.

The internal cavity 22 contains a cosmetic product (not shown) such as defined in EC Regulation N° 1223/2009 of the European Parliament and the Council of Nov. 30, 2009, for example a toilet water, a perfume, a deodorant, or a hair styling product.

The dispensing device 14 is arranged through the neck 24 in such a way as to fully seal the neck 24. It is fixed, at its periphery, to the edge of the neck 24.

The dispensing device 14 comprises a dispensing valve 30 and a dish 32.

The dish 32 defines a central passage for the cosmetic product. The valve 30 is engaged in the central passage and is linked to the dish 32 in such a way as to prevent the passage of a fluid through the central passage between the valve 30 and the dish 32 when the pressure of this fluid is less than or equal to the pressure in the cavity 22.

The dish 32 provides the connection of the valve 30 to the receptacle 12. To this effect, the dish 32 is crimped, at its periphery, to the edge of the neck 24.

The valve 30 comprises a valve body 40, an actuating rod 42, and a return element 44.

The valve body 40 is arranged entirely on the same side of the dish 32. In particular, the valve body 40 is arranged entirely on the side of the dish 32 oriented towards the cavity 22.

The valve body 40 is rigidly inked to the dish 32. To this effect, the dish 32 is for example crimped onto the valve body 40.

The valve body 40 comprises a cylindrical portion 50 that defines an interior chamber 52 that opens inside the reservoir 12 by an opening 54 for the entry of the cosmetic product towards the outside an opening 56 for the passage of the rod 42. The openings 54, 56 are formed at the axial ends opposite the cylindrical portion 50. Note that the term "cylindrical" is used here and in the rest of the application in its widest degree of acceptance, and encompasses cylinders of revolution as well as cylinders with a polygonal section.

The valve body 40 further comprises a seal 60 surrounding the orifice for exiting 56. Said seal 60 is arranged bearing against the dish 32 and provides the seal between the valve body 40 and the dish 32.

The actuating rod 42 is substantially coaxial to the cylindrical portion 50. It extends through the passage 34 and the opening 56. It as such extends in part into the chamber 52 and in part outside of the chamber 52. The seal 60 is in contact with a lateral face 61 of the rod 42 in such a way as to carry out a seal between the rod 42 and the valve body 40.

The actuating rod 42 defines an axial duct 62, inside the rod 52, for the dispensing of the cosmetic product. This duct 62 opens outside the rod 52 via at least one cosmetic product inlet orifice 64 (visible in FIG. 4) and by a cosmetic product outlet orifice 66. The inlet orifice 64 is arranged radially in the lateral face 61. The outlet orifice 66 is arranged in an axial end of the rod 42 located outside the chamber 52. The lower axial end of the rod 42 as such defines a bottom 67.

Figure 4:
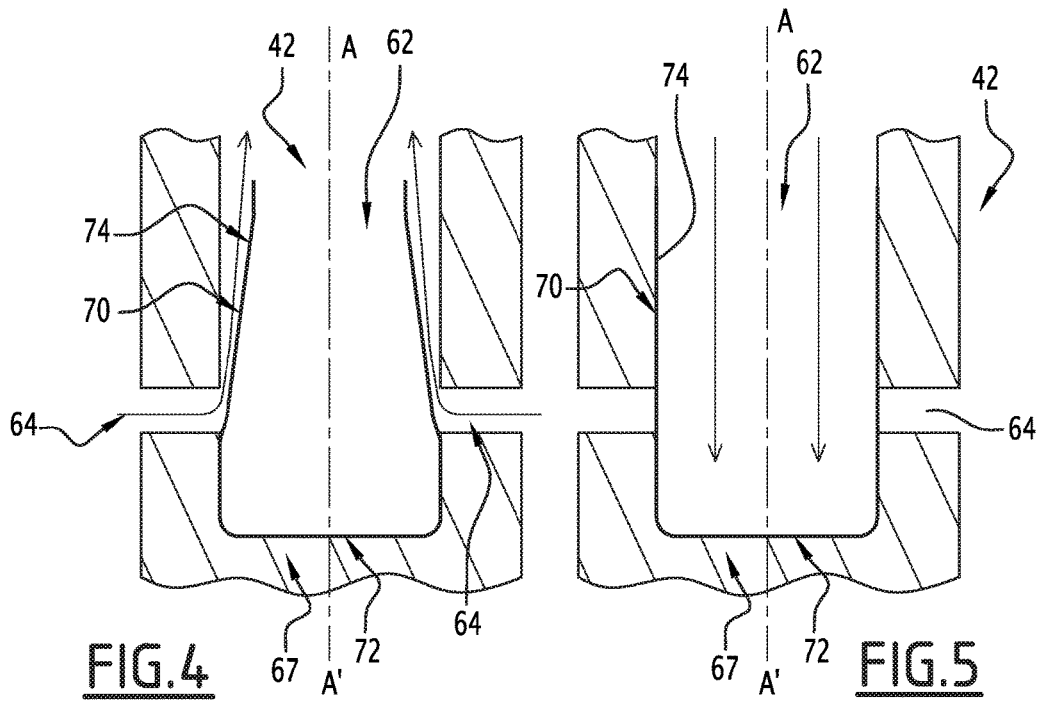
FIG. 4 is a detail of FIG. 2 illustrating a non-return valve of the assembly for packaging, deformed in an open position allowing the passage of the product.

Preferably, as shown in FIG. 4, the rod 42 comprises two inlet orifices 64. The two inlet orifices 64 are advantageously diametrically opposite.

Figure 2:
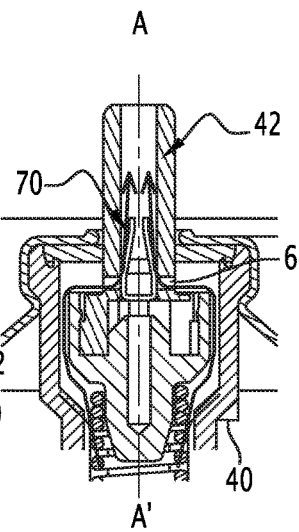
FIG. 2 is a cross-section view of the assembly for packaging of FIG. 1 during the usage phase of the assembly for packaging.
Figure 3:
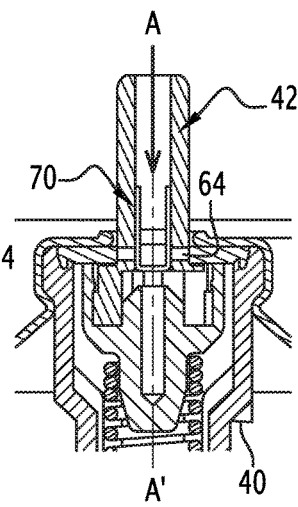
FIG. 3 is a cross-section view of the assembly for packaging of FIG. 1, during a phase of attempting to fill the assembly for packaging after usage of the product.

The actuating rod 42 is mounted mobile in the chamber 52 along its axis A-A' between a blocking position of the cosmetic product, shown in FIGS. 1 and 3, wherein the inlet orifice 64 is not in fluidic communication with the chamber 52, and a releasing position of the cosmetic product, shown in FIG. 2, wherein the inlet orifice 64 is in fluidic communication with the chamber 52. In particular, in blocking position, the inlet orifice 64 is positioned facing the seal 60 and, in releasing position, the orifice for entry 64 is positioned in the chamber 52.

The actuating rod 42 carries an abutment 68 in order to stop the actuating rod 42 when it arrives in blocking position. This abutment 68 is also adapted to prevent the actuating rod 42 from entirely exiting the chamber 52. To this effect, the abutment 68 is, in the example shown, adapted to be in contact with the seal 60 when the rod 42 is in blocking position. The abutment 68 is as such, in the example shown, constituted by a shoulder, oriented towards the seal 60, of the rod 42.

The return element 44 is adapted to urge the rod 42 towards its locking position. The blocking position as such constitutes a rest position of the rod 42.

The return element 44 is in particular arranged in the chamber 52. In the example shown, this return element 44 is a compression spring interposed between the axial end of the rod 42 positioned in the chamber 52 and the axial end of the cylindrical portion 50 wherein is arranged the inlet opening 54.

According to the invention, the dispensing device 14 also comprises an non-return valve 70 arranged inside the actuating rod 42 in order to prevent the circulation of a fluid in the duct 62 from the outlet orifice 66 towards the inlet orifice 64.

The non-return valve 70 here comprises a base 72 fixed to the bottom 67 of the rod 42 and a deformable portion 74.

The non-return valve 70 is made of a flexible material. Advantageously, the non-return valve 70 is made in a single piece by being integral with the material, for example made of elastomer.

The portion 74 is deformable between a closed position for sealing each inlet orifice 64, applied against the lateral face 61 of the rod 42, and an open position for the releasing of each inlet orifice 64, separated from the lateral face 61

Figure 5:
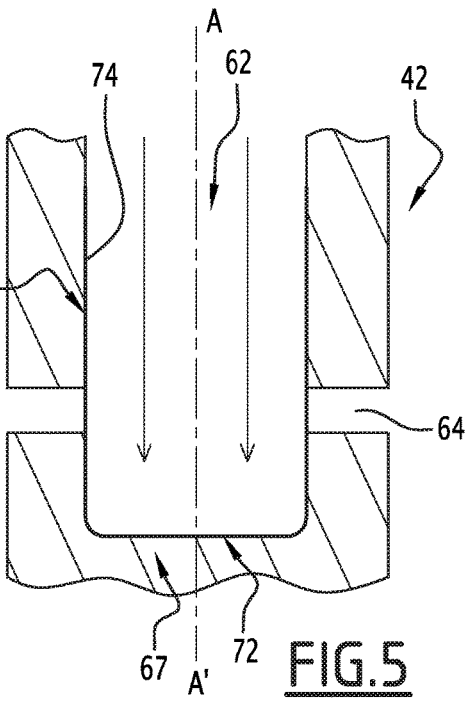
FIG. 5 is a detail of FIG. 2 illustrating the non-return valve in closed position preventing the passage of the product.

When the deformable portion 74 is in closed position, as can be seen in FIGS. 3 and 5, the deformable portion 74 seals each inlet orifice 64. As such, the circulation of fluid in the duct 62 from the outlet orifice 66 to the inlet orifice 64 is prevented.

When the mobile portion 74 is in open position, as can be seen in FIGS. 4 and 6, the deformable portion 74 no longer seals the orifices for the entry 64. As such, the circulation of fluid between the inlet orifice 64 and the outlet orifice 66 is possible.

In this example, the closed position constitutes a position towards which the deformable portion 74 of the non-return valve 70 is continuously actuated. As such, when the mobile portion 74 is in open position, the mobile portion 74 is urged towards the closed position.

Advantageously, the non-return valve 70 is mounted pre-stressed in the duct 62 of the rod 42 in order to continuously actuated against the lateral face 61, including in the closed position.

In reference to FIG. 1, a method for manufacturing an assembly for packaging 10 according to the first embodiment shall now be described.

Firstly, the reservoir 12 and the dispensing device 14 are supplied. The non-return valve 70 is already inserted into the duct 62 of the rod 42.

The reservoir 12 and the dispensing device 14 are then assembled to one another, in such a way that the dispensing device 14 closes the reservoir 12.

The reservoir 12 is then filled with the cosmetic product. To this effect, the cosmetic product is injected, under pressure, between the dish 32 and the seal 60, as shown by the arrows in FIG. 1. The cosmetic product is as such released in the cavity 22.

Then, the dish 32 is crimped to the edge 26 surrounding the mouth 24 through which the cavity 22 opens to the outside of the reservoir 20.

The use of the assembly for packaging 10 will now be described, in reference to FIGS. 2 and 3.

With normal use, such as shown in FIG. 2, a user actuates the assembly for packaging 10 in such a way as to cause the displacement of the rod 42 to the releasing position. When the rod 42 is in releasing position, the cosmetic product, under the effect of the pressure in the reservoir 12, penetrates into the duct 62 by the inlet orifice 64.

This product, which is at the pressure of the reservoir 12, exerts a force on the deformable portion 74 of the non-return valve 70, and as such pushes the deformable portion 74 to the axis A-A'. This provokes the deformation of the deformable portion 74 from the closed position to the open position, such as shown in FIG. 4.

The cosmetic product then flow into the duct 62 to the orifice for exiting 66 by going around the non-return valve 70. The cosmetic product is as such dispensed normally, as shown by the arrows in FIG. 2.

In the case of a fraudulent attempt to fill the reservoir 12, such as shown in FIG. 3, a user injects a product under pressure into the duct 62 via the orifice for exiting 66, as shown by the arrows in FIG. 3.

This product bears on the deformable portion 74 of the non-return valve 70 and presses or maintains pressed the deformable portion 74 against the lateral face 61, in such a way that the deformable portion 74 is maintained in closed position, as shown in FIG. 5.

In this position, the deformable portion 74 fully seals the inlet orifice 64. As such, the product injected cannot penetrate into the reservoir 12, and the filling of the reservoir 12 is prevented.

In a second embodiment of the invention shown in FIGS. 6 and 7, the non-return valve 70 is as a single piece with the rod 42. The non-return valve 70 does not include any base.

In this embodiment, the open position is an idle position of the deformable portion 74. As such, unlike the first embodiment, when the deformable portion 74 is in closed position, it is urged towards the open position.

Unlike the first embodiment also, the rod 42 comprises a single inlet orifice 64. The deformable portion 74 is able, in closed position, to be placed opposite the inlet orifice 64, and to be pressed against the inner peripheral surface of the rod 42 above the inlet orifice 64, by bending in such a way as to prevent a circulation of product between the inlet orifice 64 and the orifice for exiting 66.

The deformable portion 74 of the non-return valve 70 according to this embodiment has a beveled shape. As such, when the deformable portion 74 is in open position, an injection of fluid from the orifice for exiting 66 is able to exert a force on the deformable portion 74, in such a way that the deformable portion 74 is deformed by bending towards the closed position.

Advantageously, the inner surface of the rod 42 defines a flat area whereon is applied the free end of the deformable portion 74 in the close position.

In a third embodiment shown in FIG. 8, the non-return valve comprises a fixed base 72 of cylindrical shape inserted by force into the bottom 67 of the rod 42.

The deformable portion 74 projects from the base 72. It has a hollow annular membrane shape defining a central passage opening axially outwards of the rod 42.

When idle, the deformable portion 74 is in open position. The free edge of the deformable portion 74 converges towards the axis A-A'.

During an injection of product into the duct 62 via the orifice for exiting 66, the product expands the deformable portion 74 which is deformed radially from its arc to pass into its closed position. The free end of the deformable portion 74 moves farther from the axis A-A' and is pushed against the inner peripheral surface of the rod 42 above each orifice of entry 64.

The passage of the product from the outside to the reservoir 22 through the orifice 64 is therefore prevented.

In an alternative of the method for manufacturing, the cosmetic product is injected into the reservoir 22 through the rod 42, before the fastening of the non-return valve 70 in the rod 42.

Thanks to the invention described hereinabove, the re-use of empty assemblies for packaging is limited. Indeed, this re-use is possible only by using very high filling pressures which are not available to fraudsters.

Furthermore, the non-return valve 70 used is very discreet, in such a way that the objective hereinabove is achieved without increasing the steric hindrance of the assembly for packaging.

The invention claimed is:

1. A device for dispensing a product as a spray, comprising a dispensing valve comprising:
   a valve body, defining a chamber interior to the valve body opening onto the outside of the valve body by a product inlet opening and by a passage opening,
   an actuating rod, defining a product dispensing duct, inside the rod, the duct opening onto the outside of the rod via at least one product inlet orifice and via a product outlet orifice, the actuating rod being mounted mobile in the chamber of the valve body between a product releasing position, wherein the inlet orifice is in fluidic communication with the chamber and the outlet orifice is outside of the chamber, and a product blocking position, wherein the inlet orifice is not in fluidic communication with the chamber, and a return element of the actuating rod to its blocking position, wherein the dispensing device comprises a non-return valve arranged inside the actuating rod, the non-return valve comprising a deformable portion between a closed position, applied against a lateral face of the actuating rod, in which the circulation of fluid in the duct from the outlet orifice through the inlet orifice is rendered impossible, and an open position, separated from the lateral face of the actuating rod, in which the circulation of fluid through the inlet orifice to the outlet orifice is possible.

2. The dispensing device according to claim 1, wherein the closed position forms an idle position, the deformable portion in its open position being urged toward its closed position.

3. The dispensing device according to claim 2, wherein the actuating rod comprises two diametrically opposite inlet orifice, the deformable portion covering the two inlet orifice in its closed position.

4. The dispensing device according to claim 2, wherein the non-return valve comprises a base fixed on a bottom of the rod.

5. The dispensing device according to claim 2, wherein the non-return valve comprises a base fixed on a bottom of the rod.

6. The dispensing device according to claim 2, wherein the non-return valve is in one piece with the rod.

7. The dispensing device according to claim 1, wherein the open position forms an idle position, the deformable portion in its closed position being urged toward its open position.

8. The dispensing device according to claim 7, wherein the non-return valve comprises a base fixed on a bottom of the rod.

9. The dispensing device according to claim 7, wherein the non-return valve is in one piece with the rod.

10. The dispensing device according to claim 1, wherein the actuating rod comprises two diametrically opposite inlet orifice, the deformable portion covering the two inlet orifice in its closed position.

11. The dispensing device according to claim 10, wherein the non-return valve is in one piece with the rod.

12. The dispensing device according to claim 1, wherein the non-return valve comprises a base fixed on a bottom of the rod.

13. The dispensing device according to claim 12, wherein the base is mounted by force in the bottom of the rod.

14. The dispensing device according to claim 12, wherein the non-return valve is in one piece with the rod.

15. The dispensing device according to claim 1, wherein the non-return valve is in one piece with the rod.

16. The dispensing device according to claim 1, wherein the deformable portion is a membrane advantageously made of elastomer.

17. An assembly for packaging a product, comprising a reservoir containing a product and a dispensing device according to claim 1 that close said reservoir.

18. A method for manufacturing the assembly for packaging according to claim 17, comprising the following successive steps:

supplying of the reservoir and of the dispensing device, filling of the reservoir;

irreversible closing of the reservoir with the dispensing device the non-return valve being arranged in the dispensing duct.

19. The method according to claim 18, in which the non-return valve is arranged in the dispensing duct before the filling of the reservoir, the filling of the reservoir being carried out around the dispensing device, without displacement of the actuating rod in releasing position.

20. The method according to claim 18, in which the non-return valve is arranged in the dispensing duct after the filling of the reservoir.

* * * * *